US009742695B2

(12) United States Patent
Yanagida et al.

(10) Patent No.: US 9,742,695 B2
(45) Date of Patent: Aug. 22, 2017

(54) RELAY DEVICE AND CONNECTOR (71) Applicant: YAZAKI CORPORATION, Minato-ku, Tokyo (JP)

(72) Inventors: You Yanagida, Susono (JP); Hiroki Hamaguchi, Susono (JP)

(73) Assignee: YAZAKI CORPORATION, Minato-Ku, Tokyo (JP)

( * ) Notice: Subject to any disclaimer, the term of this patent is extended or adjusted under 35 U.S.C. 154(b) by 445 days.

(21) Appl. No.: 14/076,740

(22) Filed: Nov. 11, 2013

(65) Prior Publication Data
US 2014/0064289 A1 Mar. 6, 2014

Related U.S. Application Data (63) Continuation-in-part of application No. PCT/JP2012/061709, filed on May 8, 2012.

(30) Foreign Application Priority Data

May 11, 2011 (JP) ................. 2011-105801

(51) Int. Cl.
H04L 12/28 (2006.01)
H04L 12/46 (2006.01)
H04L 12/933 (2013.01)
H04L 25/03 (2006.01)
H04L 25/24 (2006.01)

(52) U.S. Cl.
CPC ........ H04L 49/15 (2013.01); H04L 25/03878 (2013.01); H04L 25/245 (2013.01)

(58) Field of Classification Search
None
See application file for complete search history.

(56) References Cited

U.S. PATENT DOCUMENTS 8,140,358 B1 * 3/2012 Ling ..................... G06Q 40/08
340/439
2008/0205565 A1 8/2008 Fuhrmann et al.
2009/0304387 A1 * 12/2009 Farries .................. H04J 3/1694
398/67
2010/0008456 A1 1/2010 Rohatschek
(Continued)

FOREIGN PATENT DOCUMENTS

JP 2008-537430 A 9/2008
JP 2008-277873 A 11/2008
(Continued)

OTHER PUBLICATIONS

International Search Report of PCT/JP2012/061709 dated Jun. 12, 2012.
(Continued)

Primary Examiner — Alpus H Hsu
(74) Attorney, Agent, or Firm — Sughrue Mion, PLLC (57) ABSTRACT To provide a relay device capable of increasing the number of connected nodes in a bus-type network, and a connector providing the relay device. An active-star coupler as the relay device includes a bit width distortion correction circuit and a ringing pulse absorption circuit, corrects bit width distortion in bit units using the bit width distortion correction circuit and absorbs and eliminates ringing pulses in a terminus of a communication frame using the ringing pulse absorption circuit.

7 Claims, 8 Drawing Sheets (56) References Cited

U.S. PATENT DOCUMENTS

2010/0046594 A1 2/2010 Hartwich et al.
2010/0219992 A1 9/2010 Rohatschek
2012/0327978 A1* 12/2012 Nishimura ........ H04L 12/40032
375/211

FOREIGN PATENT DOCUMENTS

JP 2009-505464 A 2/2009
JP 2009-94748 A 4/2009
WO 2006117721 A2 11/2006

OTHER PUBLICATIONS

Communication dated Mar. 18, 2015 from the European Patent Office in counterpart European Application No. 12781900.1.
Uhlhorn R W: "A robust fibre optic active star coupler for the SAE linear token-passing multiplex data bus", May 23, 1988; May 23, 1988-May 27, 1988, May 23, 1988 (May 23, 1988), pp. 174-181, XP010076888.

* cited by examiner

RELAY DEVICE AND CONNECTOR

CROSS-REFERENCE TO RELATED APPLICATIONS

The present invention is based on Japanese Patent Application No. 2012-238984, which is incorporated herein by reference.

BACKGROUND OF THE INVENTION

1. Field of the Invention

This invention relates to a relay device used in order to create an on-vehicle LAN such as an active star coupler and a connector providing the relay device.

2. Background of the Invention

The FlexRay standard which can ensure a superiority of both rapidity and liability as a next-generation on-vehicle LAN is enacted. The FlexRay is a communication protocol which is applied to in-vehicle communication requiring high liability, such as steering-by-wire, brake-by-wire, etc., in the field of automobile industry. As the FlexRay adopts a time-trigger type communication system, high liability can be maintained by designing a bus-system in which a time-slot of predetermined time is defined in a communication bus (e.g., see Japanese Unexamined Patent Application Publication No. 2009-94748, Japanese Unexamined Patent Application Publication No. 2008-277873, and Japanese Publication of PCT Application No. 2008-537430).

Figure 10:
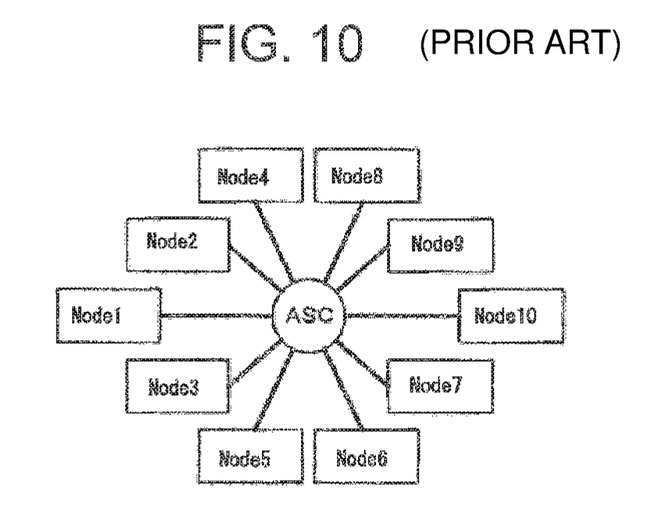
FIG. 10 is an explanatory drawing indicating a network configuration of the star type FlexRay.
Figure 11:
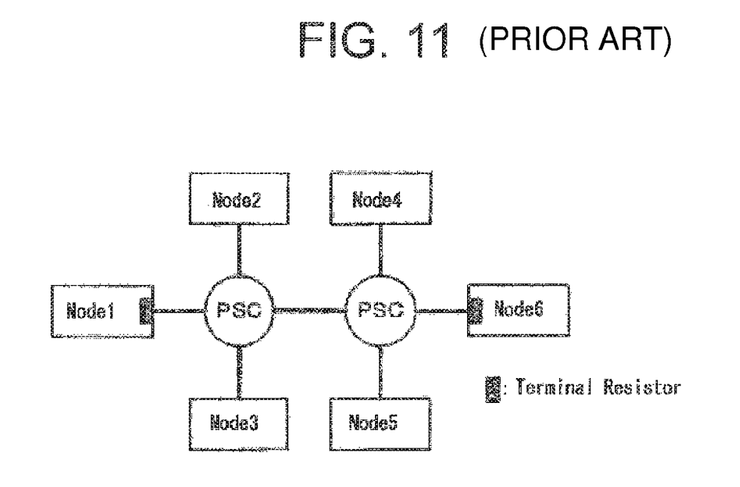
FIG. 11 is an explanatory drawing indicating a network configuration of the bus type FlexRay.

The FlexRay is a star type network as shown in FIG. 10, or a bus type network as shown in FIG. 11. An active-star coupler (ASC) as the relay device as shown in FIG. 10 performs relaying and branching with a bus-driver, and a passive-star coupler (PSC) as the relay device as shown in FIG. 11 performs relaying and branching without the bus-driver.

In recent years, there is a tendency for the number of devices connected to on-vehicle LAN (i.e., the number of nodes) to increase. Among the aforementioned two types of networks, the star type is connected in point-to-point manner, thereby realizing strength against delay and deterioration of waveform. On the other hand, due to the connection and accordingly increasing number of the nodes wire harness routing is difficult to decrease.

If the FlexRay is used as a replacement of a conventional CAN (Controller Area Network), it is necessary to connect a lot of nodes with the bus type network. In this case, inserting an ASC between PSCs as shown in FIG. 12 can increase the number of nodes.

Figure 12:
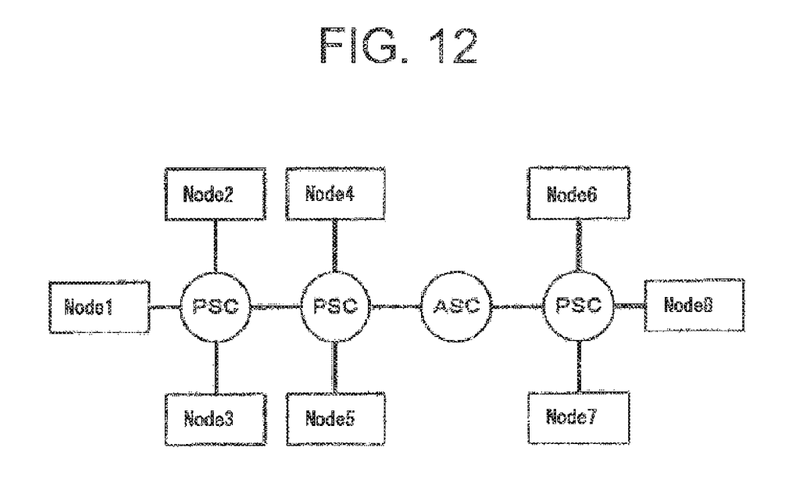
FIG. 12 is an explanatory drawing indicating an enlarged configuration of a bus type network FlexRay.

Although in FIG. 12 the number of relay (i.e., relay times) during the transmission between nodes increases, as a conventional ASC only has a function of the bus-driver and of waveform shaping in a voltage axis direction (i.e., amplitude direction), influences of bit width distortion and ringing pulses to a signal transmitted between nodes increases. As a result, there happen bit error which is caused by the bit width distortion and accordingly change in the period of one bit, and an abnormal waveform in a time axis direction in which due to the influence of ringing pulse the terminus of communication frame is misaligned and the communication frame is extended. Therefore, even if FIG. 12 configuration is applied, there is a problem that such a many nodes cannot be connected.

SUMMARY OF THE INVENTION

Accordingly, this invention has an object to provide a relay device and a connector including the relay device in order to increase the number of connecting nodes at a bus type network.

An embodiment of the invention to solve the aforementioned object is a relay device which includes, in the relay device which receives an input signal and processes the input signal to transmit an output signal, a bit width distortion correction portion subjecting the input signal to bit width distortion correction for each bit unit, a ringing pulse eliminating portion subjecting the signal corrected in the bit width distortion portion to ringing pulse of a terminus of the input signal elimination.

Another embodiment of the invention is characterized that the input signal includes a signal indicating a head of a data, and the bit width distortion correction portion detects the signal indicating the head of the data and generates the sampling signal to sample the input signal for each bit unit according to the signal indicating the head of the detected data as a reference.

Another embodiment of the invention is characterized that the bit width distortion correction portion samples at the center of 1 bit duration of the input signal.

Another embodiment of the invention is characterized that the input signal includes a signal indicating a terminus of a data, and the ringing pulse eliminating portion fixes a signal level of signals continued to the signal indicating the terminus of the data to a predetermined level, when the ringing pulse eliminating portion detects the signal indicating the terminus of the data.

Another embodiment of the invention, in a connector including a connection portion with a mating connector, is characterized to provide a relay device described in the above embodiments.

According to an embodiment of the invention described above, the relay device includes the bit width distortion correction portion subjecting the input signal to bit width distortion correction for each bit unit, the ringing pulse eliminating portion subjecting the signal corrected in the bit width distortion portion to ringing pulse of a terminus of the input signal elimination. For this reason, in order to capable of waveform shaping of not only voltage axis direction but a time axis direction, influences of bit width distortion in the relay device and ringing pulses in a terminus of the input signal may be minimized, and the number of connection nodes may be increased.

According to another embodiment of the invention described above, the input signal includes a signal indicating a head of data, and the bit width distortion correction portion detects the signal indicating the head of the data and generates a sampling signal to sample the input signal for each bit unit according to the signal indicating the head of the detected data as a reference. As a result, the input data may be sampled at fixed intervals, and a bit width distortion may be corrected with small delay.

According to another embodiment of the invention described above, the bit width distortion correction portion samples at the center of 1 bit duration of the input signal. As a result, in order to capable of sampling where influences of the bit width distortion becomes the smallest, influences of bit width distortion may be minimized.

According to another embodiment of the invention described above, the input signal includes a signal indicating a terminus of a data, and the ringing pulse elimination portion fixes a signal level of signals continued to the signal indicating the terminus of the data to a predetermined level, when the ringing pulse eliminating portion detects the signal indicating the terminus of the data. For the reason, an extension of the frame depending on the influences of ringing pulses after the terminus of the data may be prevented.

According to another embodiment of the invention described above, the relay device described in the above embodiments is provided for the connector including the connection portion with a mating connector. For the reason, functions of the relay device may be provided to the connector connecting wire harnesses with each other. Furthermore, the connector that influences of bit width distortion and ringing pulses may be minimized and the number of connection nodes may be increased is provided. Also, restrictions of mounting position of the relay device are eased by making the connector having functions of the relay device. As a result, flexibility of routing of the wire harness is enhanced.

DESCRIPTION OF THE EMBODIMENTS

Figure 1:
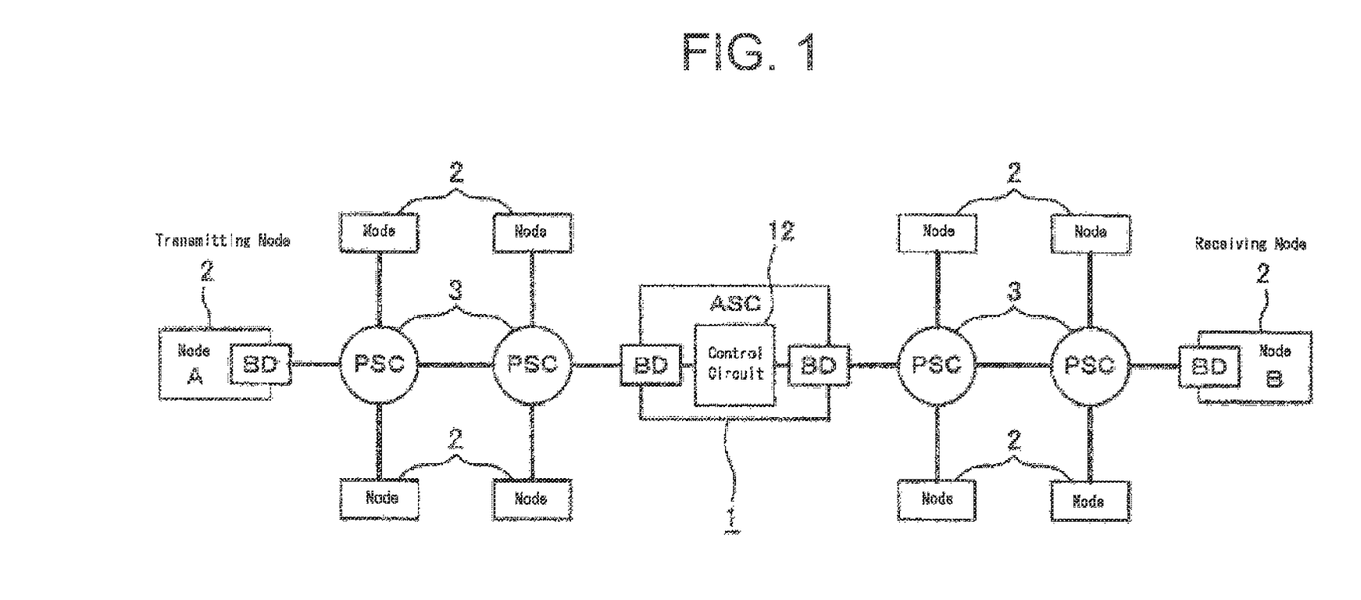
FIG. 1 is a configuration diagram of network including a relay device in accordance with an exemplary embodiment of the invention.

Next, an exemplary embodiment will be described with reference to FIG. 1 to FIG. 9. FIG. 1 is a configuration diagram of the FlexRay network including an ASC 1 as a relay device in accordance with an exemplary embodiment of this invention. The FlexRay network includes node 2 of on-vehicle devices, etc. and PSCs 3 and the ASC 1, as shown in FIG. 1. Each node 2 includes a bus-driver BD at a connection with a communication wire (In FIG. 1, a bus-driver BD is shown only at a node A and a node B, is not shown at other nodes 2). If the node A is a transmission node and the node B is a receiving node, a data which is transmitted from the node A is relayed from the first PSC 3 to the second PSC 3, then to the ASC 1, next to the first PSC 3, and finally to the second PSC 3, and the node B receives the data.

Figure 2:
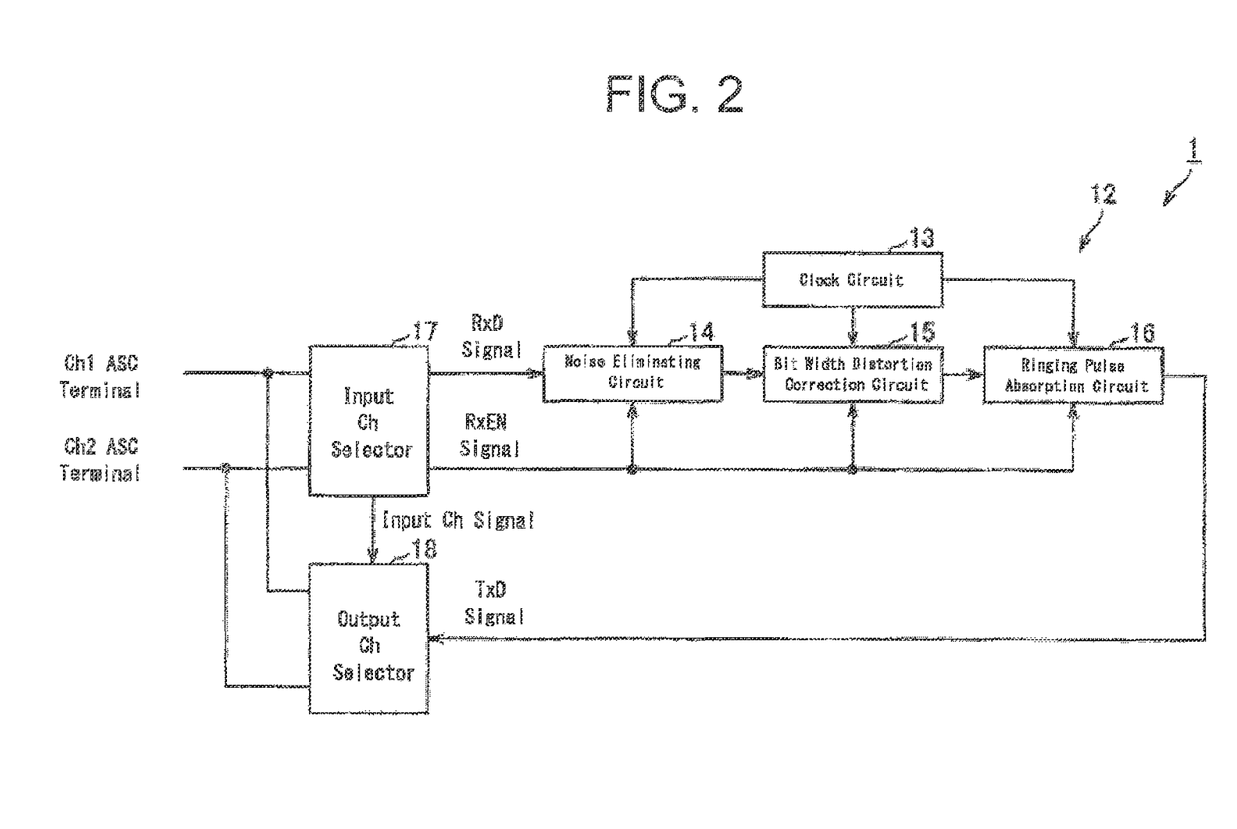
FIG. 2 is a block diagram of a relay device in accordance with an exemplary embodiment of the invention.

The ASC 1 includes a bus driver BD and a control circuit 12. The control circuit 12, as shown in FIG. 2, includes a clock circuit 13, a noise eliminating circuit 14, a bit width distortion correction circuit 15, a ringing pulse absorption circuit 16, an input Ch selector 17, and an output Ch selector 18. Also, the ASC 1 has two channels (input/output) of Ch1 and Ch2, and each channel is decided to either input or output by transmission direction of the data at the time of communication. For example, when Ch1 is the left side of FIG. 1 and Ch2 is the right side of FIG. 1, if the data is transmitted from the left side to the right side, Ch1 becomes input and Ch2 becomes output. On the other hand, if the data is transmitted from the right side to the left side, Ch2 becomes input and Ch1 becomes output.

The clock circuit 13 generates a 40 MS/s (40 mega sampling per seconds) clock signal and provides the noise eliminating circuit 14, the bit width distortion correction circuit 15, and the ringing pulse absorption circuit 16 with the clock signal. In this embodiment, a clock signal of 50 ns (nano seconds) frequency is generated and applied as a clock signal of 40 MS/s by sampling at both rising and falling edges.

The noise eliminating circuit 14 includes a digital filter eliminating radiation noise and conduction noise from outside. In order to prevent error-sampling depending on impulse noise which is generated by influences of radiation noise and conduction noise from outside, the impulse noise is eliminated by majority decision processing of coinciding with two times in three sampling.

Figure 3:
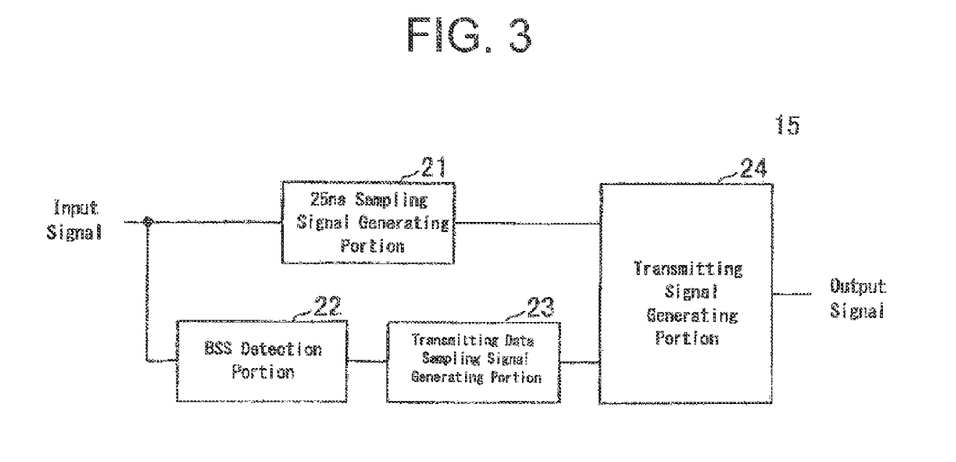
FIG. 3 is a block diagram of a bit width distortion correction circuit illustrated in FIG. 2.

A bit width distortion correction portion 15, as shown in FIG. 3, includes a 25 ns sampling signal generating portion 21, a BSS detection portion 22, a transmitting data-sampling generating portion 23, and a transmitting signal generating portion 24, and performs a processing to correct bit width distortion in bit units to an input signal.

The 25 ns sampling signal generating portion 21 samples the input signal (input data) by a 40 MS/s clock signal provided from the clock circuit 13, and outputs the sampled input signal to a transmitting signal generating portion 24.

The BSS detection portion 22 detects a BSS (Byte Start Sequence) as a signal indicating a head of data which is included in a communication frame of the FlexRay, and outputs a signal indicating to detect (BSS detection signal) to a transmitting data-sampling signal generating portion 23.

The transmitting data-sampling signal generating portion 23 generates a transmitting data-sampling signal described later as a BSS detection signal outputted by the BSS detection portion and outputs to the transmitting signal generating portion 24.

The transmitting signal generating portion 24 further samples the input signal which is sampled in the 25 ns sampling signal generating portion 21 based on a transmitting data sampling signal which is generated in the transmitting data sampling signal generating portion 23, and the sampled signal becomes an output signal of the bit width distortion correction circuit 15.

Figure 4:
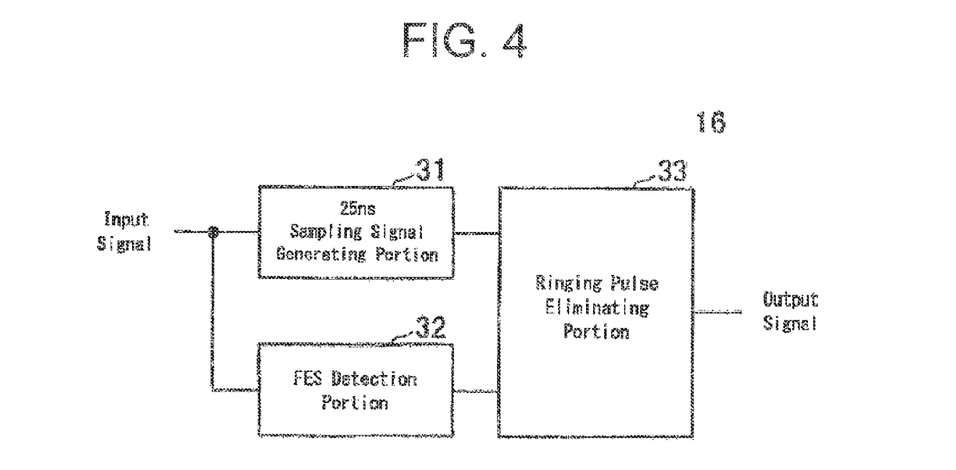
FIG. 4 is a block diagram of a ringing pulse absorption circuit illustrated in FIG. 2.

The ringing pulse absorption circuit 16 as a ringing pulse eliminating portion, as shown in FIG. 4, includes the 25 ns sampling signal generating portion 31, a FES detection portion 32, a ringing pulse eliminating portion 33, and performs a processing to eliminate ringing pulses of a terminus of the input signal to a signal that the bit width distortion is corrected in the bit width distortion correction portion 15.

The 25 ns sampling signal generating portion 31 samples the input signal (input data) by a 40 MS/s clock signal provided from the clock circuit 13, and outputs the sampled input signal to the ringing pulse eliminating portion 33.

The FES detection portion 32 detects a FES (Frame End Sequence) as a signal indicating a terminus of data which is included in the communication frame of the FlexRay, and outputs a signal indicating to detect (FES detection signal) to the ringing pulse eliminating portion 33.

The ringing pulse eliminating portion 33 absorbs and eliminates a ringing pulse of a frame terminus to the input signal which is sampled in the 25 ns sampling signal generating portion 31, when the FES detection signal is detected in the FES detection portion 32, and the eliminated signal becomes the output signal of the ringing pulse absorption circuit 16.

The input Ch selector 17 is connected with a Ch 1 ASC terminal and a Ch 2 ASC terminal, detects either the Ch 1 ASC terminal or the Ch 2 ASC terminal as an input, and outputs to the noise eliminating circuit 14 as a input signal RxD. Further, the selector 17 detects a TSS described later of the communication frame, generates an RxEN signal described later, and outputs to the noise eliminating circuit 14, the bit width distortion correction circuit 15 and the ringing pulse absorption circuit 16. Also, the selector 17 outputs information that either the Ch1 ASC terminal or the Ch 2 ASC terminal is as an input.

The output Ch selector 18 is connected with the Ch1 ASC terminal and the Ch2 ASC terminal, and sets a non-input terminal as an output based on information which either the Ch 1 ASC terminal or the Ch 2 terminal from the input Ch selector is an input.

Incidentally, the RxEN signal may provide separately an RxEN signal generating circuit which is in connection with the Ch 1 ASC terminal and the Ch 2 ASC terminal without generating from the input Ch selector 17, and may have a function that the bus driver BD generates the RxEN signal. Although this embodiment describes an example that the ASC 1 has two channels, three or more channels may be applied.

Figure 5:
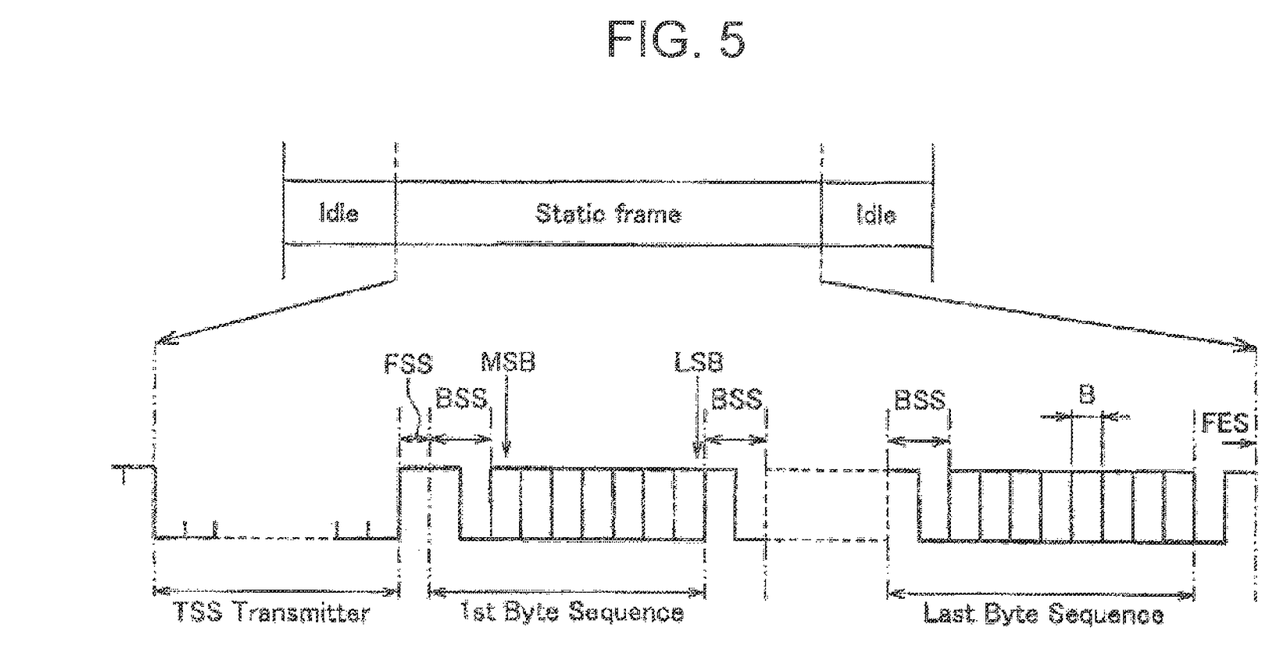
FIG. 5 is an explanatory drawing indicating a communication frame of the FlexRay.

Next, a structure of the communication frame of the FlexRay will be described with reference to FIG. 5. The communication frame (static frame) as shown in FIG. 5 is formed of a TSS, an FSS, transmitting data, and an FES. The TSS (Transmission Start Sequence) is the data indicating a finish of an idle state and a start of transmission and is formed by sequential low level ("Lo"). The FSS (Frame Start Sequence) is the data indicating a finish of TSS and a head of a frame and is formed by 1 bit high level ("Hi"). The BSS is the data indicating a brake of bit units in frame data, and is formed by 2 bit data consisting of 1 bit of "Hi" and 1 bit of "Lo", namely, two bit data "10". The FES is the data indicating an end of a frame, and is formed by a 2 bit data consisting of 1 bit of "Lo" and 1 bit of "Hi", namely, two bit data "01".

As mentioned above, in the transmitting data, the BSS is inserted by byte units; 1 byte sequence is formed by a total of 10 bits of the transmitting data consisting of the BSS and 1 byte. Also, a bit width B which is 1 bit is 200 ns (5 M bps). The communication frame is sandwiched in an interval that a valid data is not transmitted which is called an idle state. Although the idle state is set a high level ("Hi"), at the time of output from the bus driver BD to outside, the idle state becomes an intermediate level between the high level ("Hi") and the low level ("Lo").

Next, an operation of a function which corrects bit width distortion in a bit width distortion correction circuit 15 will be described with reference to a timing chart of FIG. 6. The timing chart as shown in FIG. 6 is a figure indicating from the input signal of the bit width distortion correction circuit 15 to the output signal, which includes signals that each block in the bit width distortion correction circuit 15 generates.

Figure 6:
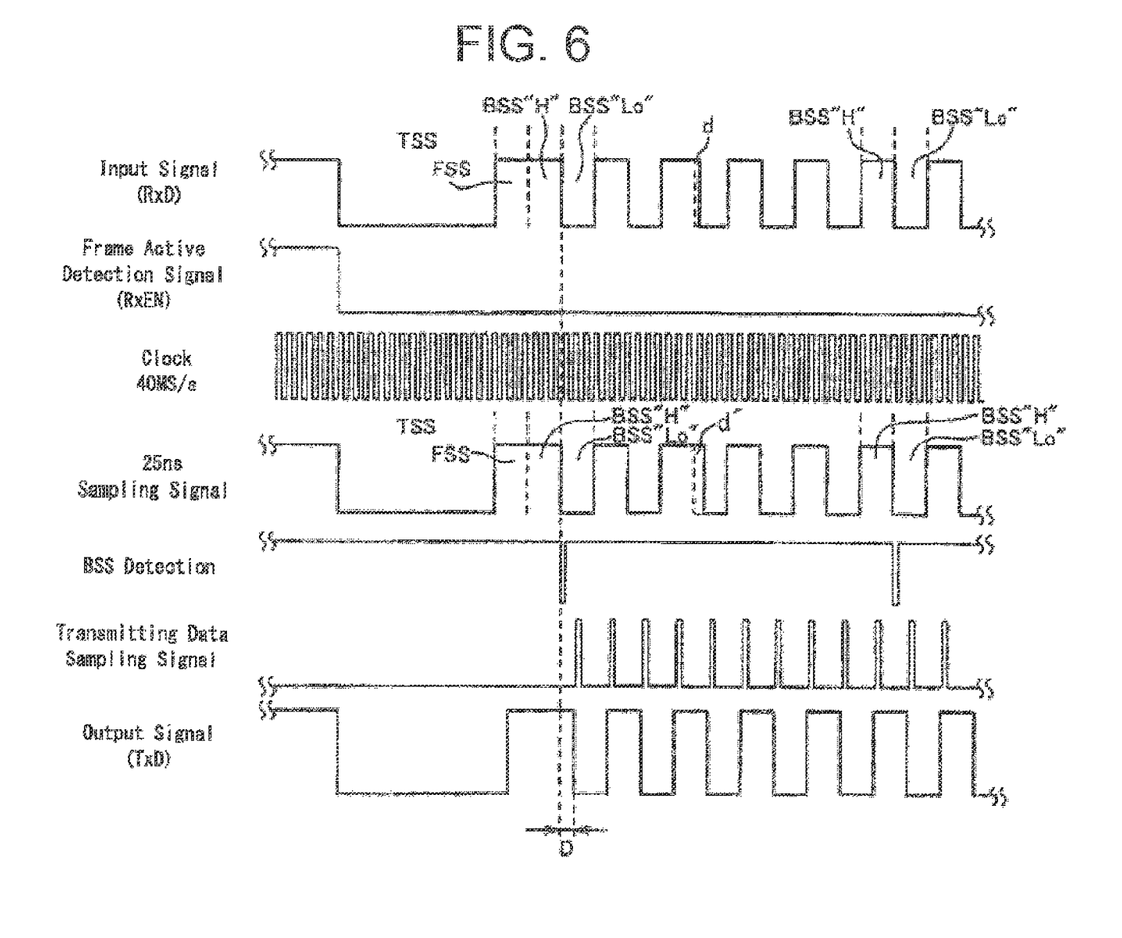
FIG. 6 is a timing chart indicating an operation of a bit width correction circuit illustrated in FIG. 2.

The input signal (RxD) in FIG. 6 is the input signal of the bit width distortion correction circuit 15. A frame active detection signal (RxEN), in an RxD, is a signal that becomes a low level ("Lo") when the TSS is detected and a high level ("Hi") when the idle state is detected. It is recognized that this RxEN is an interval that the interval of "Lo" is a valid communication frame (static frame). The 40 Ms/s clock is a clock signal generated from the clock circuit 13.

Figure 7:
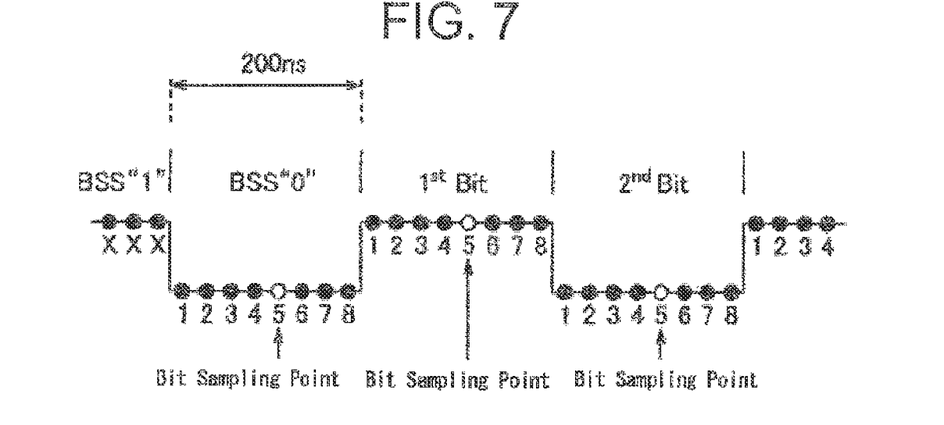
FIG. 7 is a waveform diagram indicating a sampling of an input signal according to a 25 ns sampling signal.

The 25 ns sampling signal, in the 25 ns sampling signal generating portion 21, is a signal sampled the RxD by 40 MS/s clock. As shown in FIG. 7, 8 times sampling may be executed during 1 bit interval by such a sampling.

The BSS detection is a BSS detection signal that the BSS detection portion 22 outputs. The BSS detection detects a transition (falling) from the high level ("Hi") to the low level ("Lo") of the BSS. As a result, a pulse signal outputs once. The transmitting sampling signal outputs one pulse after 5 times sampling interval by 40 MS/s clock based on BSS detection. Then, total 10 pulses are outputted by 8 times sampling interval (1 bit interval). As a result, the transmitting data sampling signal may be located to the center of 1 bit interval (the fifth time in 8 times sampling).

An output signal (TxD) is a signal which is the 25 ns sampling signal re-sampled with the transmitting data sampling signal. Namely, the TxD is generated to the 25 ns sampling signal by using a transmitting signal data sampling signal as a strobe signal (which is a point of bit sampling in FIG. 7). In other words, the TxD is sampled with the transmitting data sampling signal by bit units. The bit units have a meaning to output the next bit with sampling, after a data which is serially inputted at every 1 bit is outputted as a TxD with 1 bit sampling. Also, time delay, as shown in FIG. 6, is smaller than 1 bit interval of degree of generating position of the transmitting data sampling signal from a head of bit, rather than collectively receiving the data and re-generating as the TxD. As a result, the bit width distortion may be corrected with small delay.

In this way of generating the TxD, for example, if there is a bit width distortion d in the RxD of FIG. 6, in other words, if 1 bit interval becomes long as much as the bit width distortion, the bit width distortion is increased to the interval d' by a phase relationship between the clock signal and the RxD upon generating the 25 ns sampling signal. However, in order to provide a strove at the center of each bit interval with the transmitting data sampling signal, the bit width distortion d' does not carry over to the TxD, and may return to normal bit width.

Next, an operation of a function to eliminate ringing pulses will be described with reference to a timing chart of FIG. 8. A timing chart as shown in FIG. 8 is a figure indicating the input signal and the output signal of the ringing pulse absorption circuit 16.

Figure 8:
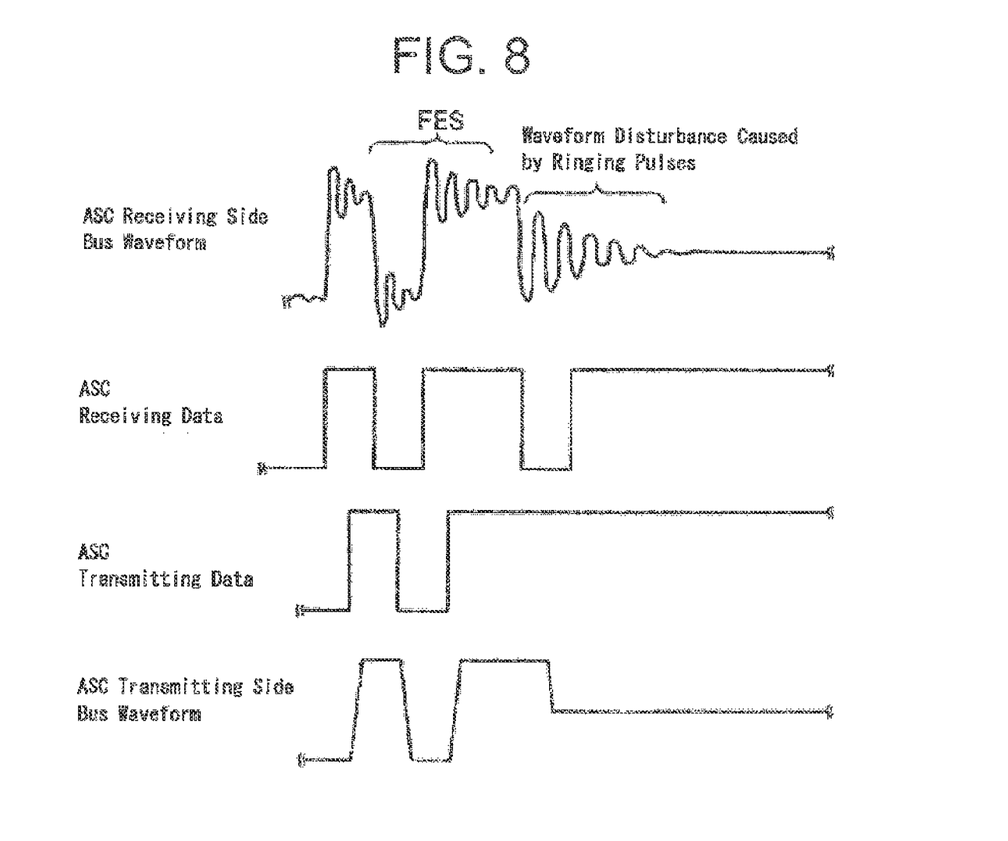
FIG. 8 is a timing chart indicating an operation of the ringing pulse absorption circuit illustrated in FIG. 2.

A bus waveform of an ASC receiving side in FIG. 8 is a signal waveform at the time of signal receiving from outside in the bus driver BD that the ASC 1 as shown in FIG. 1 includes. The ASC receiving data is a binarized waveform, while a signal waveform received at the bus driver BD is outputted to the control circuit 12. The ASC transmitting data is an output signal waveform of the ringing pulse absorption circuit 16. A bus waveform of an ASC transmitting side is a signal waveform at the time of signal transmitting to outside in the bus driver BD of the signal waveform that a signal from the ringing pulse absorption circuit 16 is outputted.

The bus waveform of the ASC receiving side is disturbed by influence of ringing pulses, while the waveform moves to a signal level of the idle state after the FES, as shown in FIG. 8. Therefore, in the ASC receiving data, a meaningless data after the FES with binarizing is generated, and an extension of the communication frame is occurred. Thus, the meaningless data is an abnormal waveform (noise) of time axis direction as same as the bit width distortion, and cannot be eliminated on the processing algorithm, in the noise eliminating circuit 14 to eliminate impulse noise. Therefore, when the ringing pulse absorption circuit 16 detects the FES by the FES detection portion 32, the ringing pulse eliminating portion 33 fixes a signal level of after the FES to the high level "Hi". Therefore, aforementioned meaningless data is ignored. For this reason, an extension of the communication frame caused by ringing pulses may disappear. A fixing process of "Hi" level by the ringing pulse eliminating portion 33 is continued until the RxEN is changed to "Hi" level. In other words, the process is continued until the idle state is detected in an input side.

According to the embodiment, the ASC 1 includes the bit width distortion correction circuit 15 and the ringing pulse absorption circuit 16. As a result, the bit width distortion correction circuit 15 may correct bit width distortion, the ringing pulse absorption circuit 16 may absorb and eliminate ringing pulses of a terminus of the communication frame, and shape the waveform of time axis direction as a countermeasure of the bit width distortion and the extension of the communication frame. Therefore, the influence of bit width distortion and the ringing pulses at the ASC 1 may be minimized, and the number of connection nodes may be increased.

The bit width distortion correction circuit 15 detects the BSS, generates a transmitting data sampling signal to locate at the center of 1 bit interval based on the detected the BSS, and samples the input signal for each bit unit as the transmitting data sampling signal is a strobe signal. Therefore, if the BSS is detected, the input data may be sampled at fixed intervals at the center of the bit interval, and the bit width distortion may be corrected with small delay. In aforementioned embodiment, although an example that 1 bit interval becomes longer depending on bit width distortion is described, when 1 bit interval becomes short, the bit width distortion may be corrected by sampling at the center of 1 bit interval.

The bit width distortion correction circuit 15 generates a transmitting data by sampling at every 1 bit interval of the transmitting data sampling signal. As a result, the process may be done at every 1 bit, and the bit width distortion may be corrected with small delay.

The bit width distortion correction circuit 15 generates the transmitting data sampling signal based on the detection of the BSS. As a result, to retake a basis at every 10 bits of both the BSS and 1 byte may prevent the sampling error, etc. from accumulating.

When the ringing pulse absorption circuit 16 detects the FES, the signal level of the FES transition is fixed to "Hi". For this reason, the extension of the communication frame depending on the influence of ringing pulses after the FES may be prevented.

Figure 9:
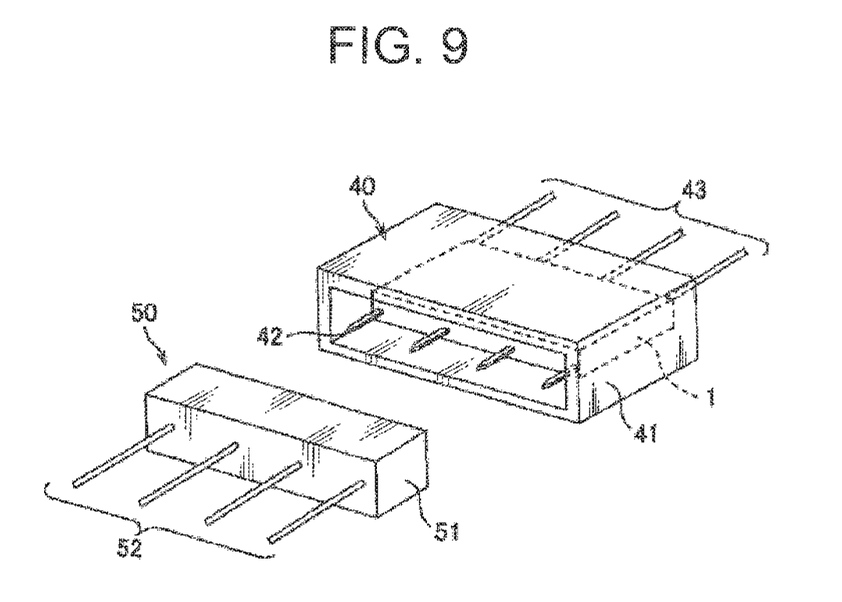
FIG. 9 is a perspective view of an intermediate connector including the relay device illustrated in FIG. 1.

Furthermore, the aforementioned structure of the ASC 1 may be implemented to an intermediate connector. FIG. 9 is a perspective view of an intermediate connector 40. The intermediate connector 40 includes a connector housing 41, a connection terminal 42, a wire harness 43, and engages with a mating connector 50.

The connector housing 41 is formed in a flat box shape and made of insulating synthetic resin, etc. One side of the housing is attached the wire harness 43 which is formed of several electric wires, which includes a core wire at one side and a covering portion covering the core wire. The other side which is engaged with the mating connector 50 is recessed to accommodate the mating connector 50. In the rear side of the recess, a terminal 42 is provided as a connection portion.

The ASC 1 is accommodated in the connector housing 41 and electrically connected with the terminal 42 and the wire harness 43. In other words, either one of the terminal 42 or the wire harness 43 becomes a receiving side, or the other becomes a transmitting side.

The mating connector 50 includes a connector housing 51 and a wire harness 52. The connector housing 51 is formed in a flat box shape and made of insulating synthetic resin, etc. One side of the housing is attached the wire harness 52 which is formed of several electric wires, which includes a core wire at one side and a covering portion covering the core wire. In the other side which is engaged with the intermediate connector 40, connected means which are not illustrated are provided and electrically connected in the wire harness 52 and the connector housing 51.

The ASC 1 is incorporated to the intermediate connector 40 as shown in FIG. 9. As a result, a function of the ASC 1 may be provided to the intermediate connector 40 connecting wire harnesses each other. Furthermore, the intermediate connector 40 has a function that the number of connecting nodes may be increased by decreasing the influence of bit width distortion and ringing pulses. Also, restrictions of mounting position of the ASC 1 is eased by making the intermediate connector 40 have functions of the ASC 1. As a result, flexibility of routing of the wire harness is enhanced.

In the aforementioned embodiment, the transmitting data sampling signal may be not the fifth time but the fourth time in 8 times sampling during 1 bit interval. In other words, the signal may be the center of the 1 bit interval. In addition, the center does not mean to restrict only 100 ns position when 1 bit interval is 200 ns, but means a bit sampling point close to 100 ns. Therefore the fourth time and fifth time of the aforementioned embodiment becomes the center. Also, the input signal samples 8 times during 1 bit interval. Needless to say, the sampling is not restricted to 8 times.

In the aforementioned embodiment, the FlexRay as a communication protocol is described. However, the communication protocol which is a serial data transfer of bus format and includes a data corresponding to the BSS or the FES may be applied.

Furthermore, the aforementioned embodiments are only shown some representatives of this invention, and this invention is not limited of these embodiments. Therefore, it can be performed with several changes without deviating from the scope of this invention.

REFERENCE SIGNS LIST

1 ASC (relay device)
15 bit width distortion correction circuit (bit width distortion correction portion)
16 ringing pulse absorption circuit (ringing pulse eliminating portion)
40 intermediate connector (connector)
42 terminal (connection portion)

What is claimed is:

1. A relay device for receiving an input signal including a communication frame comprising a signal indicating a head of data, a plurality of bits of data, and a signal indicating a terminus of data by an input channel, and for processing the input signal to transmit an output signal from an output channel, the relay device comprising:
   a clock circuit configured to generate a clock signal having a frequency higher than that of the input signal and provide the clock signal to a bit width distortion correction circuit and a ringing pulse absorption circuit;

the bit width distortion correction circuit performing bit width distortion correction processing on the input signal for each bit of the plurality of bits of data; and the ringing pulse absorption circuit performing ringing pulse elimination processing on the input signal corrected in the bit width distortion circuit by a ringing pulse elimination portion to eliminate ringing pulses present in the input signal after the terminus of data, wherein the bit width distortion correction circuit detects the signal indicating the head of data and generates a sampling signal using the clock signal provided from the clock circuit to sample the plurality of bits of data according to the signal indicating the head of data as a reference, wherein the ringing pulse absorption circuit fixes a signal level of signals continued to the signal indicating the terminus of data to a predetermined level when the ringing pulse absorption circuit detects the signal indicating the terminus of data, the predetermined level indicating an idle state, and wherein an output signal from the ringing pulse absorption circuit is transmitted to the output channel.

2. The relay device according to claim 1, wherein the bit width distortion correction circuit samples at a center of each bit of the plurality of bits of data.

3. The relay device according to claim 1, wherein the sampling signal has lower frequency than frequency of the clock circuit.

4. A connector comprising:

a relay device for receiving an input signal including a communication frame comprising a signal indicating a head of data, a plurality of bits of data, and a signal indicating a terminus of data by an input channel, and for processing the input signal to transmit an output signal from an output channel, the relay device comprising:

a clock circuit configured to generate a clock signal having a frequency higher than that of the input signal and provide the clock signal to a bit width distortion correction circuit and a ringing pulse absorption circuit;

the bit width distortion correction circuit performing bit width distortion correction processing on the input signal for each bit of the plurality of bits of data; and the ringing pulse absorption circuit performing ringing pulse elimination processing on the input signal corrected in the bit width distortion circuit by a ringing pulse elimination portion to eliminate ringing pulses present in the input signal after the terminus of data, wherein the bit width distortion correction circuit detects the signal indicating the head of data and generates a sampling signal using the clock signal provided from the clock circuit to sample the plurality of bits of data according to the signal indicating the head of data as a reference, wherein the ringing pulse absorption circuit fixes a signal level of signals continued to the signal indicating the terminus of data to a predetermined level when the ringing pulse absorption circuit detects the signal indicating the terminus of data, the predetermined level indicating an idle state, wherein an output signal from the ringing pulse absorption circuit is transmitted to the output channel, and a connection portion is electrically coupled to the relay device, wherein the connection portion engages with a mating connector.

5. The connector according to claim 4, wherein the bit width distortion correction circuit samples at a center of each bit of the plurality of bits of data.

6. The connector according to claim 4, wherein the sampling signal has lower frequency than frequency of the clock circuit.

7. A network system comprising:

an active coupler for receiving an input signal including a communication frame comprising a signal indicating a head of data, a plurality of bits of data, and a signal indicating a terminus of data by an input channel and for processing the input signal to transmit an output signal from an output channel, the active coupler comprising:

a clock circuit configured to generate a clock signal having a frequency higher than that of the input signal and provide the clock signal to a bit width distortion correction circuit and a ringing pulse absorption circuit;

the bit width distortion correction circuit performing bit width distortion correction processing on the input signal for each bit of the plurality of bits of data; and the ringing pulse absorption circuit performing ringing pulse elimination processing on the input signal corrected in the bit width distortion circuit by a ringing pulse elimination portion to eliminate ringing pulses present in the input signal after the terminus of data, wherein the bit width distortion correction circuit detects the signal indicating the head of data and generates a sampling signal using the clock signal provided from the clock circuit to sample the plurality of bits of data according to the signal indicating the head of data as a reference, wherein the ringing pulse absorption circuit fixes a signal level of signals continued to the signal indicating the terminus of data to a predetermined level when the ringing pulse absorption circuit detects the signal indicating the terminus of data, the predetermined level indicating an idle state, and wherein an output signal from the ringing pulse absorption circuit is transmitted to the output channel;

a plurality of nodes; and at least two passive couplers, wherein the passive couplers are connected to the plurality of nodes, wherein the active coupler is inserted between the passive couplers.

* * * * *